United States Patent [19]

Amorese et al.

[11] 4,279,356
[45] Jul. 21, 1981

[54] QUICK OPENING MANHOLE COVER ASSEMBLY

[75] Inventors: Franklyn J. Amorese; Vincent J. Piarulli, both of Greece, N.Y.

[73] Assignee: Sybron Corporation, Rochester, N.Y.

[21] Appl. No.: 90,287

[22] Filed: Nov. 1, 1979

[51] Int. Cl.³ ............................................. B65D 45/28
[52] U.S. Cl. ..................................... 220/314; 49/465; 404/25
[58] Field of Search ...................... 404/25, 26; 49/324, 49/463, 394, 465, 466; 70/167, 169, 158; 114/201, 203; 220/240, 231, 234, 233, 238, 314, 251

[56] References Cited

U.S. PATENT DOCUMENTS

| | | | |
|---|---|---|---|
| 1,324,981 | 12/1919 | Roesch | 220/251 |
| 1,473,408 | 11/1923 | Richardson | 220/231 |
| 2,335,309 | 11/1943 | Pfleumer | 220/251 |
| 2,488,524 | 11/1949 | Castellano | 114/203 X |
| 2,891,694 | 6/1959 | Ackley | 220/238 |
| 2,991,904 | 7/1961 | Carideo | 220/231 |
| 3,386,612 | 6/1968 | Kirkwood | 220/231 |
| 3,916,800 | 11/1975 | Hutchison | 114/203 X |
| 4,175,781 | 11/1979 | Dumortier | 49/465 |

Primary Examiner—Nile C. Byers, Jr.
Attorney, Agent, or Firm—Theodore B. Roessel; Roger Aceto

[57] ABSTRACT

A quick opening manhole cover including a clamping flange (16) which captures the ears (48) of a locking ring (46) upon rotation of the locking ring with respect to a manhole cover (40). The manhole cover has an O.D. less than the I.D. of the manhole for axial movement into the manhole. A gasket (42) about the manhole cover is clamped between the locking ring (46), manhole cover (40) and against the manhole surface upon axial movement of the manhole cover towards the locking ring.

15 Claims, 4 Drawing Figures

QUICK OPENING MANHOLE COVER ASSEMBLY

BACKGROUND OF THE INVENTION

The present invention relates to manhole cover assemblies for glass lined steel pressure vessels, and more particularly to a quick opening manhole cover assembly for such vessels.

Glass lined steel pressure vessels are well known in the art and are used, for example, by the chemical and food industry to process various chemicals and food stuffs. Such vessels can be relatively large, ranging in capacity to several thousand gallons, and can be constructed to withstand internal pressures of several atmospheres. It is common to provide such vessels with manholes to permit entry into the vessel for cleaning and inspection.

Usually, the cover for such a manhole is clamped directly to a flange surrounding the manhole opening. The clamps are sized to withstand the load necessary to compress a gasket between the manhole cover and the flange in order to obtain a leak-free joint. It is not uncommon to use many large clamps in order to distribute the load evenly about the manhole cover and to use a hand tool, such as a wrench, to individually tighten each clamp. Use of a hand tool can result in overtightening that could cause distortion of the flange and glass damage. Use of clamps that can be removed or left untightened may result in unsafe conditions. For example, such clamps or the handtool used to tighten the clamps could drop into the vessel and damage the glass lining.

Moreover, in order to secure the cover in the prior art, each clamp had to be individually wrench tightened several times to properly seat the gasket. This procedure could take as long as an hour depending upon the size of the manhole, the number of clamps used and the pressures expected within the vessel. Conversely, to open the manhole cover, each clamp had to be loosened and removed.

The present invention provides a quick opening manhole assembly where the manhole cover can be opened or closed within one minute without using hand tools. No clamps are used to compress a gasket between the manhole cover and the vessel and once an initial seal is made, the pressure within the vessel automatically compresses a gasket for a tighter seal. The quick opening manhole assembly of the present invention is an integral assembly which can be retrofitted to existing glass lined pressure vessels.

DESCRIPTION OF THE PREFERRED EMBODIMENTS

Figure 1:
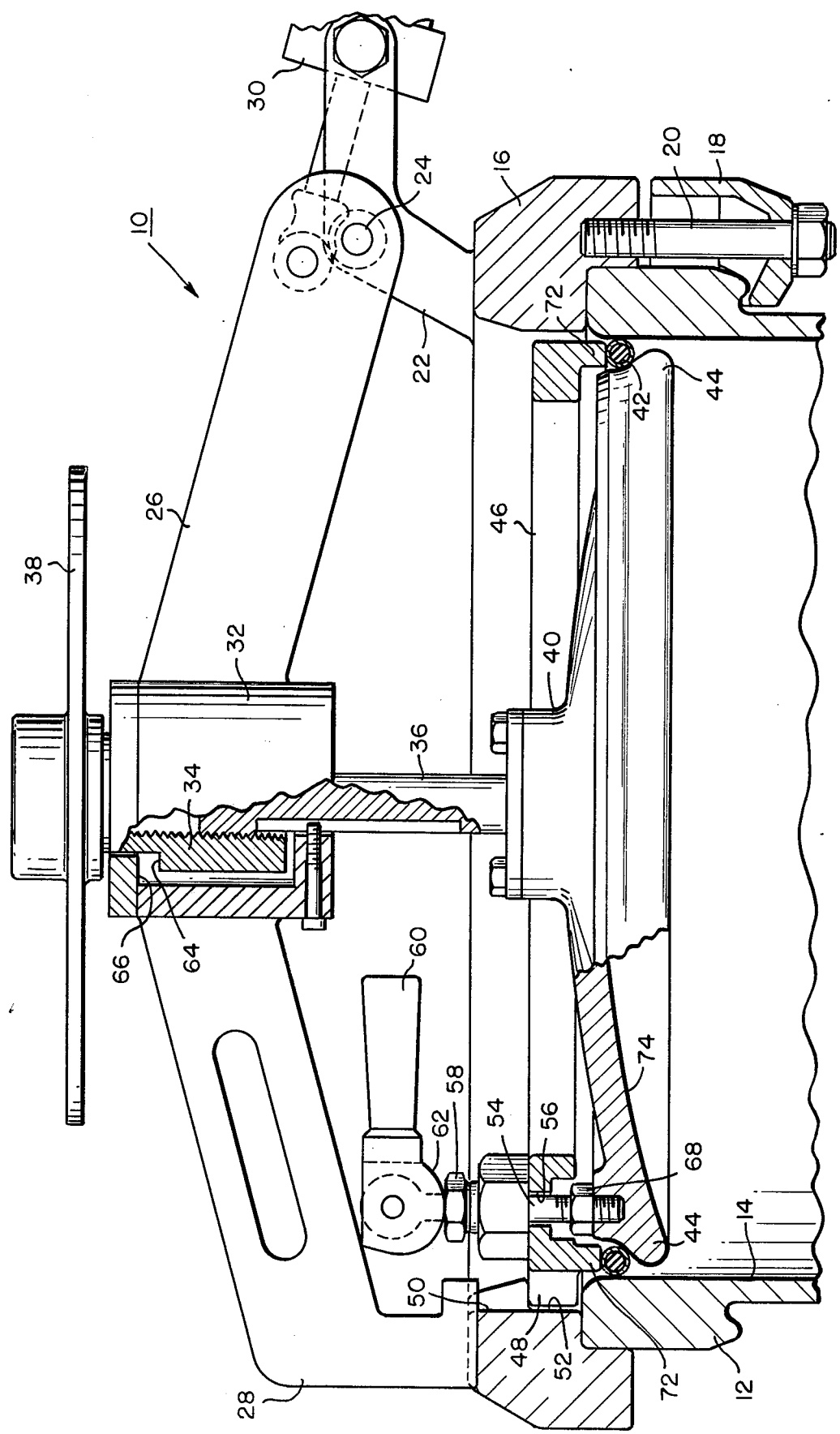
FIG. 1 is an elevation view partly broken away and in section showing the manhole cover assembly of the present invention in a closed position.

Referring to the drawings, FIG. 1 shows the quick opening manhole cover assembly generally indicated at 10, fixed to a flange 12 about a vessel manhole. It should be appreciated that the interior manhole surface 14, as well as the interior surface of the pressure vessel (not shown) and the surfaces of all elements of the manhole cover assembly 10 exposed to the environment of the pressure vessel is provided with a corrosion and abrasion resistant glass or ceramic coating as is common in the art.

One component of the quick opening manhole cover assembly 10 is a collar 16. Collar 16 is placed about the manhole flange 12 and is fixed to the manhole flange by any suitable means such as clamps 18 and bolts 20 located at spaced intervals about the manhole.

Upstanding from collar 16 at one side of the manhole opening is a bracket 22. Pivoted to this bracket at 24 is one end of a bridge structure 26 which spans the manhole opening. The other end 28 of the bridge rests on collar 16 opposite bracket 22. Also attached to the bracket 22 and to bridge 26 is a counter balance mechanism 30, the details of which form no part of the present invention.

Bridge structure 26 includes a housing 32. Within the housing is a drive nut 34 and drive screw 36. One end of the drive nut extends through the housing for attachment to a handwheel 38. Rotation of the handwheel rotates nut 34 which in turn causes axial movement of screw 36. The screw extends down through the housing for attachment to a manhole cover 40.

As best seen in FIG. 1 the outside diameter of the manhole cover is less than the inside diameter of the manhole so that the cover can move easily into and out of the manhole. To this end, turning the handwheel 38 rotates screw 36 for moving the manhole cover axially into and out of the manhole opening.

Figure 2:
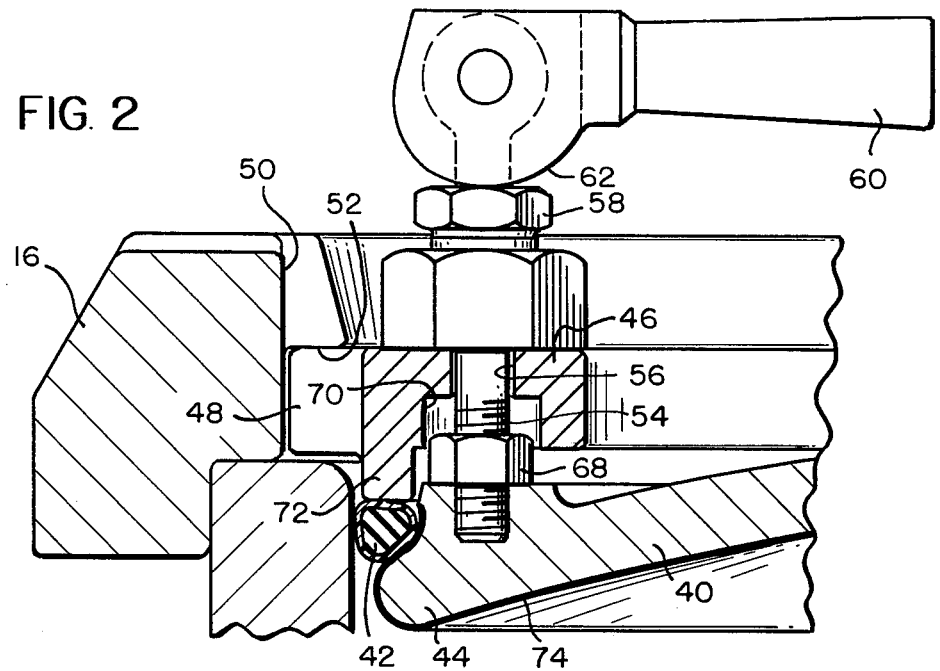
FIG. 2 is a view on enlarged scale showing a portion of the assembly shown in FIG. 1.
Figure 3:
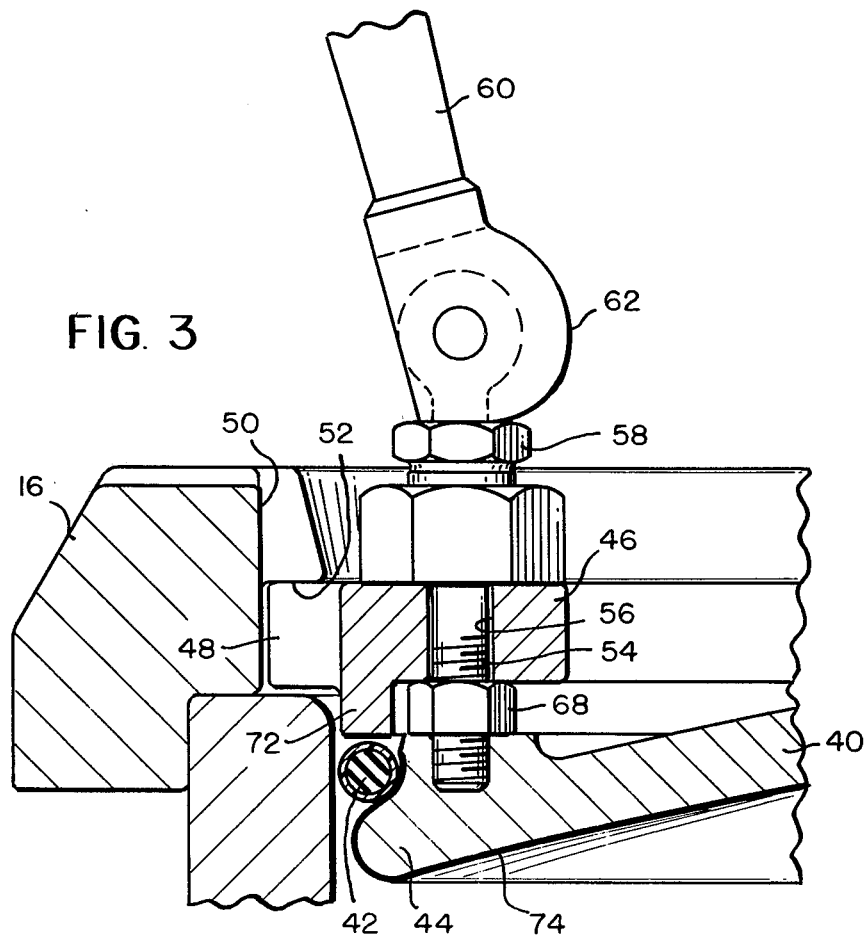
FIG. 3 is a view similar to FIG. 2, only showing the assembly in an unsealed position.

Disposed about the outer periphery of manhole cover 40 is an annular seal member 42. Seal 42 may be on O-ring of suitable corrosion resistant material or an appropriately clad gasket or the like as is well known in the art. As shown in FIGS. 1-3, the outer peripheral surface of manhole cover 40 is contoured so that a portion 44 of the manhole cover underlies seal member 42 to help retain the seal member on the manhole cover.

Carried by and supported on manhole cover 40 is a locking ring 46. This ring 46 has three ears 48 spaced at 120° intervals about the locking ring. These ears are adapted to engage corresponding vertical slots and horizontal grooves 50, 52 respectively in collar 16 for purposes set out hereinbelow.

Locking ring 46 is held captive to manhole cover 40 at three points, each including a cam lock, one of which is shown in each of FIGS. 1-3. One element of each cam lock is a bolt 54 which is threaded to manhole cover 40 and extends upwardly through a elongated opening 56 in locking ring 46. The elongated opening allows for limited rotational movement of the locking ring with respect to the manhole cover. Bolt 54 continues upwardly, passing through a cam bearing block 58 for attachment to one end of a cam lock handle 60. This handle includes a cam surface 62 which bears against cam bearing block 58 when the cam handle is rotated for raising or lowering manhole cover 40 with respect to the locking ring 46. It should be appreciated that in order for operation of the cam lock to raise and lower manhole cover 40, there must be some allowance for vertical movement of screw 36, drive nut 34 and handwheel 38. To this end, the construction of housing 32 is such that drive nut 34 can move vertically within the housing until a shoulder 64 on the drive nut engages an end wall 66 of the housing (FIG. 1).

Figure 4:
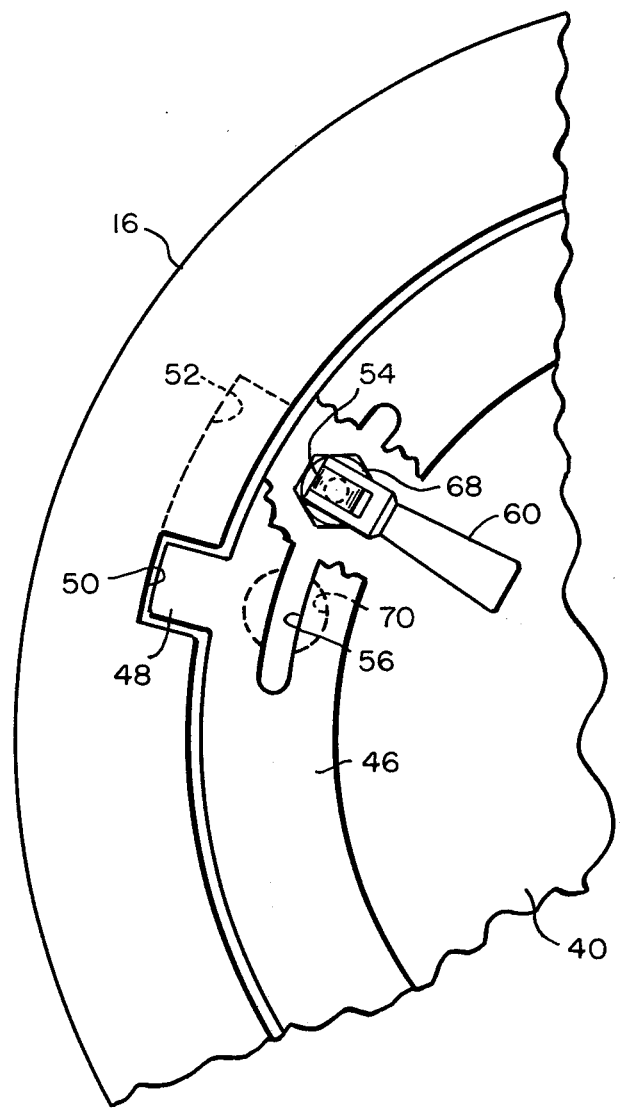
FIG. 4 is a plan view partly broken away of a portion of the assembly shown in FIG. 3.

About each bolt 54 is a plug or nut 68 on the manhole cover. This nut is adapted to be received in a corresponding recess 70 formed in the bottom of locking ring 46 (FIG. 2). Thus, when the nut is not in alignment with recess 70 (FIGS. 3 and 4), the manhole cover is prevented from moving axially with respect to the locking ring. Recess 70 is brought into alignment with plug 68 by rotating the locking ring with respect to the manhole cover. Once this alignment is achieved (FIGS. 1 and 2), operation of the cam locks can move the manhole cover vertically with respect to the locking ring.

Extending downwardly from about the outer periphery of the locking ring 46 is a lip 72. When the manhole cover is in a closed position (FIGS. 1 and 2) this lip extends generally into the space between the outer periphery of the manhole cover and manhole surface 14 to provide a seat for the O-ring seal 42 as set out hereinbelow.

For purposes of describing the operation of quick opening manhole cover assembly 10, assume the manhole cover 40 is in the full closed position as shown in FIGS. 1 and 2. In this full closed position, ears 48 of locking ring 46 are fully engaged beneath collar 16 in horizontal grooves 52. In addition, manhole cover 40 is positioned so that seal member 42 is captured between lip 72 on the locking ring and the underlying portion 44 of the manhole cover and is seated against manhole wall surface 14. In this position the seal member 42 is in intimate, fluid tight engagement with each of these components. In addition, if the vessel is pressurized, the internal pressure acting on the seal member will force it upward and against each of these three components to further enhance the sealing engagement.

In order to open the manhole cover, the vessel is first depressurized. Cam lock handles 60 are then rotated so as to disengage the cam locks. This rotation moves manhole cover 40 downwardly with respect to locking ring 46 so that each plug 68 may clear from its corresponding recess 70. If need be, handwheel 38 can be rotated to drop the manhole cover an amount sufficient to permit the clearance of the plugs from the recesses. With plug 68 clear, locking ring 46 may now be rotated to the position shown in FIG. 4. This brings ears 48 into alignment with vertical slot 50 and out from beneath collar 16. Now the handwheel can be rotated to raise the manhole cover until the level of seal member 42 is at the approximate level of collar 16. Thereafter, the bridge 26 and the entire manhole cover assembly can be pivoted about bracket 22 to clear the manhole opening.

In order to close the manhole, the procedure is reversed. First the bridge 26 is pivoted downwardly until its end 28 rests against collar 16. Ears 48 are then aligned with vertical slot 50 and handwheel rotated to lower manhole cover 40 into the manhole opening. This also drops locking ring 46 to the level of horizontal groove 52. In this position, as shown in FIG. 3, seal member 42 is clear of both lip 72 on the locking ring and manhole surface 14. In order to effect an initial seal, cam lock handles 60 are operated to draw manhole cover 40 upwardly toward the locking ring. However, in the position shown in FIGS. 3 and 4, this upward movement cannot occur because plug 68 is not in alignment with recess 70. Such alignment occurs only after locking ring 46 has been rotated with respect to the manhole cover so as to carry ears 48 into horizontal groove 52 and beneath collar 16. Thus, plug 68 provides a safety feature preventing the operation of the cam locks when locking ring 46 is not in a proper position.

After proper rotation of the locking ring (clockwise as viewed in FIG. 4) recess 70 is positioned over plug 68 so that the cam locks can be operated. Operation of the cam lock draws manhole 40 upward. This carries seal member 42 into engagement with lip 72 and squeezes the seal between this lip and the underlying portion 44 of the manhole cover. Squeezing the seal in this fashion distorts the seal towards the manhole surface 14 to effect a preliminary seal between the manhole surface, locking ring 46 and manhole cover 40. Thereafter, handwheel 38 is rotated to draw up the manhole cover 40 by an amount sufficient to further compress seal member 42 and fully seat it as shown, for example, in FIGS. 1 and 2. Thereafter, when the vessel is pressurized the internal pressure acting on the manhole cover and the seal compresses the seal still further between the manhole cover and the manhole surface making a tighter seal as pressure increases.

The quick opening manhole cover assembly of the present invention is designed so that the structure used to lift and raise the manhole cover, such as bridge 26, screw 36 and the bracket 22 does not support any of the load due to internal vessel pressures. The total load from the pressure within the vessel is transmitted to the three locking ears 48 and collar 16.

While not shown, it should be appreciated that the connection between screw 36 and manhole cover 40 allows for the slight tipping of the manhole cover. This permits the cover to adjust slightly to the configuration of locking ring 46 when the cam lock handles 60 are operated so as to permit a uniform engagement of seal member 42 between the locking ring and the manhole cover.

As mentioned above, all surfaces of the manhole cover assembly and vessel which are exposed to the environment within the vessel is provided with a glass or ceramic coating. On the manhole cover 40, this coating 74 extends around the manhole cover portion 44 and behind seal member 42. Likewise the coating on the vessel interior extends over the manhole surface and above the level of seal 42.

The depending lip 72 on the locking ring need not be ceramic or glass coated because it is fully insulated from the vessel interior by the sealing engagement of the seal member between manhole surface 14 and manhole cover 40.

Thus, it should be appreciated that our invention provides a manhole cover assembly which is quick opening as contrasted to manhole covers for pressure vessels of the prior art. In this respect the present invention eliminates the need for a plurality of individually operated clamps about the periphery of the manhole cover and instead allows quick operation without special tools. Also the assembly has a suitable safety feature as provided by nuts 68 and recesses 70 to prevent pressurization of the vessel without first properly closing the manhole cover.

Having thus described the invention in detail, what is claimed as new is:

1. A quick opening manhole cover assembly for the manhole of a pressure vessel or the like comprising:
  (a) a manhole cover having an O.D. less than the I.D. of said manhole;
  (b) a locking ring mounted on said manhole cover so as to permit both axial and rotational movement of said locking ring with respect to said manhole cover between defined limits of travel;

(c) a collar fixed to said pressure vessel about said manhole;

(d) cooperating lock means on said locking ring and collar for locking said ring and collar together upon relative vertical and rotational movement of said locking ring with respect to said manhole cover to a first limit of travel;

(e) means supporting said manhole cover from said collar for axially moving said manhole cover and locking ring into and out of said manhole as a unit;

(f) means carried by said manhole cover and operatively connect to said locking ring for moving said manhole cover axially with respect to said ring; and (g) seal means carried by said manhole cover, said seal means being engaged against said manhole in fluid tight sealing engagement upon engagement of said lock means and axial movement of said manhole cover.

2. A manhole cover assembly as in claim 1 wherein said locking means comprises:

(a) said collar having a plurality of vertical slots and communicating horizontal grooves;

(b) a plurality of ears spaced about said locking ring, said ears being received in said vertical slots and horizontal grooves upon vertical and thereafter rotational movement of said locking ring.

3. A manhole cover assembly as in claim 1 including an annular lip extending from said locking ring and into the space between said manhole cover and manhole, said annular lip providing a seal seat for said seal means.

4. A manhole cover assembly as in claim 1 including cam lock means for mounting said locking ring on said manhole cover comprising:

(a) a bolt fixed to and upstanding from said manhole cover, said bolt extending through an elongated slot in said locking ring; and (b) a cam lock handle journaled to the upstanding end of said bolt, said handle having a cam surface thereon for moving said manhole cover axially with respect to said locking ring upon rotation of said cam lock handle.

5. A manhole cover assembly as in claim 4 wherein one of said manhole cover and locking ring being formed with a recess and a plug fixed to the other of said manhole cover and locking ring for reception into said recess upon alignment of said plug and recess by rotation of said locking ring with respect to said manhole cover and subsequent movement of said manhole cover axially with respect to said locking ring.

6. A manhole cover assembly as in claim 1 wherein:

(a) said seal means is disposed about the periphery of said manhole cover;

(b) said manhole cover having an outward extending peripheral portion underlying said seal means; and (c) an annular lip depending from about the periphery of said locking ring overlying said seal means, said manhole cover peripheral portion and said annular lip together forming a seal seat for said seal means.

7. A quick opening manhole cover as in claim 1 including means for supporting said manhole cover from said collar.

8. A quick opening manhole cover as in claim 1 including:

(a) a bracket upstanding from said collar;

(b) a bridge pivoted at one end to said bracket and spanning at least part of said manhole; and (c) support means suspending said manhole cover from said bridge, said support means being movable with respect to said bridge for moving said manhole cover axially into and out of said manhole.

9. A manhole cover assembly as in claim 8 wherein said support means comprises:

(a) a drive nut journaled to said bridge;

(b) a handwheel for rotating said drive nut;

(c) a screw threaded to said nut, said screw being fixed against rotation so that rotation of said nut drives said screw axially; and (d) means on said manhole cover for attaching the same to an end of said screw.

10. A manhole cover as in claim 9 wherein said nut is slidably mounted to said bridge for vertical movement between defined limits.

11. A quick opening manhole cover assembly for closing the manhole of a pressure vessel or the like comprising:

(a) a collar on said vessel about the manhole opening thereof, said collar having at least two spaced vertical slots and horizontal grooves in the inner periphery thereof, each slot communicating with one of said horizontal grooves;

(b) a manhole cover having an O.D. smaller than the I.D. of the manhole opening;

(c) a locking ring carried by and supported on said manhole cover, said locking ring being rotatably movable between defined limits with respect to said collar and manhole cover;

(d) at least two spaced ears extending radially from said locking ring, said ears adapted for reception first into said vertical slots and thereafter into a locked position in said horizontal grooves upon rotation of said locking ring with respect to said collar and manhole cover;

(e) first means extending from said collar and connected to said manhole cover for moving said manhole cover and locking ring as a unit axially into and out of the manhole opening and for carrying said ears axially into and out of said vertical slots;

(f) second means carried by said manhole cover and connected to said locking ring for moving said manhole cover axially within the manhole opening with respect to said locking ring when said ears are in said locked position;

(g) an annular seal member about the periphery of said manhole cover; and (h) an annular lip extending axially from said locking ring and about said manhole cover, said annular lip providing a seal seat for said annular seal member upon axial movement of said manhole cover towards said locking ring.

12. A manhole cover assembly as in claim 11 including an outwardly extending peripheral portion on said manhole cover underlying said seal member.

13. A manhole cover assembly as in claim 11 wherein said first means comprises:

(a) a bracket upstanding from said collar;

(b) a bridge pivoted at one end to said bracket;

(c) a drive nut and slave screw carried by said bridge, said screw having one end fixed to said manhole cover whereby rotation of said drive nut moves said screw axially to carry said manhole cover into and out of the manhole opening.

14. A manhole cover assembly as in claim 11 wherein said second means comprises a cam lock including a bolt fixed to said manhole cover and extending upward through an elongated slot in said locking ring, the upper end of said bolt being journaled to a cam lock handle, wherein rotation of said cam lock handle moves said bolt, and therefore said manhole cover, axially with respect to said locking ring.

15. A manhole cover assembly as in claim 11 wherein said locking ring has a recess communicating with said elongated slot, said recess being adapted to receive therein a plug on said manhole cover, said plug being aligned with said recess for reception therein upon rotation of said locking ring to said locked position.

* * * * *